United States Patent Office 3,507,670
Patented Apr. 21, 1970

1

3,507,670
ANTICORROSION CONCENTRATE CONTAINING A POLYAMINE SULFUR DIOXIDE REACTION PRODUCT
Philip J. Raifsnider, deceased, late of Denver, Colo., by Dorothy E. Raifsnider, executrix, Denver, Colo., assignor to Shell Oil Company, New York, N.Y., a corporation of Delaware
No Drawing. Original application Oct. 6, 1965, Ser. No. 493,536, now Patent No. 3,412,157. Divided and this application July 29, 1968, Ser. No. 749,258
Int. Cl. C09d 5/08
U.S. Cl. 106—14    7 Claims

ABSTRACT OF THE DISCLOSURE

A method of preventing corrosion of ferrous materials in contact with corrosive aqueous fluids by adding to said fluids a small amount of a reaction product obtained by reacting in an alcoholic medium a polyamine and sulfur dioxide.

---

This application is a division of copending patent application Ser. No. 493,536, filed Oct. 6, 1965, now Patent No. 3,412,157, which application is a continuation-in-part of application Ser. No. 259,431, filed Feb. 18, 1963, which has been abandoned.

Summary of the Invention

This invention relates to corrosion inhibitors and more particularly to a method of introducing specific corrosion inhibitors into aqueous or hydrocarbon mediums, such as water used as a flooding medium in oil fields or transported by a pipeline or the like.

In the recovery of petroleum from subterranean reservoirs, commercial pipelines and like applications, metal pipes and similar structures, are exposed to corrosive fluids. Most of the corrosion is produced by dissolved mamaterials or compounds in the fluids having either basic or acidic properties. For example, water may contain bicarbonate ions and the like which can cause serious corroding of metallic structures, especially those composed substantially of ferrous materials. This is true even though waters containing carbonates and bicarbonates have only a slightly acidic character, usually having a pH between 6 and 7.

Further, corrosion problems of metals result from the presence of dissolved oxygen in the corrosive fluids. The presence of even small amounts of dissolved oxygen can result in serious pitting of metallic structures, such as pipes, which is quite severe when the structures are composed substantially of ferrous materials.

An area where the corrosion of ferrous structures, such as pipes, is especially prevalent is that of the recovery of petroleum from subterranean formations. In many oil fields, it is becoming increasingly prevalent to use water floods to help displace the oil from the reservoir. In such cases, substantial amounts of water are injected through ferrous piping systems to provide the necessary injection of water to displace the oil. For example, in a typical water flood operation it is not uncommon to inject roughly 15,000 barrels of water per day (nearly 7½ million pounds of water). In some regions of the country when water flooding, fresh ground water is secured from rivers, lakes, wells and the like while in other parts the injection of water is obtained from brines recovered from subterranean formations. Notwithstanding the source of the water, operators in the field have found serious corrosion of the pipeline system is present where such large quantities of water are being injected into a formation through ferrous piping systems.

While there are many corrosion inhibiting agents on the market, the large volume of water passing through the pipe system in secondary recovery operations have rendered many of the commercially available corrosion inhibiting agents unacceptable for water floods. For example, in a single day's operation the use of glyoxalidine, a well known corrosion inhibitor, effective in the amount of about 0.1% by weight would require, based on a 15,000 barrel a day water injection, 7,500 pounds of glyoxalidine. Obviously, in water flooding operations, an expensive corrosion inhibitor like glyoxalidine is outside the realm of practical application since its cost would very probably exceed the value of the oil recovered by the water flood.

In issued patent, U.S. 3,119,447, a method is disclosed of substantially reducing corrosion in ferrous pipes and like structure by adding to water very minute amounts of a basic organic nitrogen compound and sulfite ions. When these two materials are added to water so that they are present from about 10 to about 150 p.p.m. each, the corrosion of ferrous pipes and like structures is substantially reduced.

In the referenced patent, it is indicated that the sulfite ions could be provided by injecting $SO_2$ into the water or by adding alkali metal sulfites to the water. Since the amines (polyamines and the like) which are disclosed in the referenced patent, are soluble in the low concentrations required to prevent corrosion, they may be added directly to water or other corrosive fluid to prevent corrosion of metallic structures.

In the patent referred to above is contemplated field personnel merely introducing the necessary streams of the amines and a compound providing a sulfite ion, such as $SO_2$, directly into water in the concentrations desired. While this is entirely acceptable, it can be appreciated that certain specialized equipment must be provided in the field to supply these materials to the corrosive liquid in the amounts required. However, in many applications, the field personnel were unwilling or unable to operate such sophisticated equipment and desired a single concentrate which could be fed into the water and/or other corrosive liquids in the amounts desired without having to work with sophisticated equipment.

A conventional approach might be to make a concentrated water solution of the amines and sulfite ions where the corrosive liquid is water and introduce such a concentrate into water in the field operations. While this looks attractive, the low solubility of the amines makes the production of such a concentrate nearly impossible. Further, such aqueous concentrates would not be compatible with introduction of the corrosion inhibiting materials into hydrocarbon liquids.

Another difficulty with adding substantial quantities of sulfite ion to water to form a concentrate is that the presence of calcium ions can cause a precipitation of calcium sulfite. Thus, if water containing 5,000 mg./l. of calcium ion (a rather common concentration for a ground water) is used, a precipitate of $CaSO_3 \cdot \tfrac{1}{2} H_2O$ will result at a pH of 17 of the total concentration of sulfite species $(H_2SO_3 + HSO_3^- + SO_3^=)$ exceeds 10 mg./l.

Thus, the present invention is related to the preparation of an intermediate reaction product between sulfur dioxide and polyamines which can be prepared in concentrated form and introduced into either aqueous or hydrocarbon systems to effect substantial corrosion inhibition. More specifically, the invention relates to forming a reaction product between sulfur dioxide and polyamines in an alcoholic medium whereby concentrated solutions of the reaction product can be prepared and shipped to the field or other locations for use.

In general, the method of preparing this novel reaction product includes the steps of bringing sulfur dioxide into contact with one or more N-aliphatic or N-substituted alkylenes in an alcoholic medium. A particularly suitable method is dissolving the polyamine in an alcoholic medium and passing gaseous sulfur dioxide through the medium. While it is generally desired that the polyamine and SO₂ be reacted in a stoichiometric relationship, it has been found that such a concentrate is generally corrosive. Thus, in general, about 0.8 to 1 mole of SO₂ per amine group is the most preferred combination. Actually, a convenient empirical preparation involves bubbling SO₂ through the alcoholic solution of the polyamine until a sample, when mixed with an equal volume of water, gives a pH between 5.5 and 6, at which time chemical mole ratio is within the range suggested above for a normal long chain diamine.

A large number of alcohols can be used as the alcoholic medium and methyl and/or isopropyl alcohols are excellent for the preparation of the reaction product. Methyl and ethyl alcohols are the more preferred. The alcoholic reaction product solution may be used directly or the alcohol may be removed in part or completely by gentle heating under vacuum.

More specifically the polyamines reacted with the sulfur dioxide have the general structural formula:

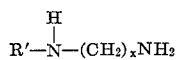

wherein R′ represents an aliphatic or alicyclic carbon chain of from about 6 to 24 carbon atoms, and $x$ is a number from 2 to 10, representing the number of methylene groups in the molecule. A preferred class of polyamines suitable for forming the reaction product of this invention are N-alkyl trimethyl diamines in which the alkyl group has from 8 to 20 carbon atoms and more preferably 12 to 20 in the chain. Also, the N-alkyl trimethylene diamines mentioned above having 12 to 18 carbon atoms in the alkyl chain are highly desirable.

In the preparation of the reaction product, the reaction of the polyamine and sulfur dioxide in the alcoholic medium is highly exothermic and care should be taken to avoid temperatures which would cause unwanted side reactions between the sulfur dioxide and diamine. Thus, if the temperature is allowed to exceed about 100° F. or poor stirring is used, elemental sulfur and other byproducts are formed. Because of the highly exothermic nature of the contacting of the polyamines with the sulfur dioxide in the alcoholic medium, it is probable that some type of reaction is occurring between the sulfur and the polyamines in the medium. However, since the exact chemical formula or structure of the product of this combination is not known, it may be an actual composition or an adduct; however, it is referred to herein as the reaction product. For example, N-propyl trimethylene diamine can be reacted in methyl alcohol with SO₂ to form a reaction product useful as a highly effective corrosion inhibitor in water. When this reaction product is added to water, it probably forms a sulfite salt of N-coco-1,3-trimethylene diamine, assuming both the diamine and sulfur dioxides were present in nearly a stoichiometric relationship. Analysis of this reaction product from a technical grade material indicated a sulfur content of 10.4% by weight, and iodometric analysis of the product being between 25.8% and 26.3% by weight calculated as SO₃. A 1% solution of this reaction product has a pH of about 4.

The reaction product is thought to be a solution of the Lewis acid-base adduct (addition compound) which, when added to water, will hydrolyze to give the sulfite-bisulfite salt of the diamine. The exothermic nature of the SO₂ addition attests to the strong interaction of SO₂ and the amine groups in the adduct. Also, the vapor pressure of SO₂ over the adduct is greatly lowered. The SO₂ comes off only after the methanol and at a pressure of the order of a methyl at 85° C. whereas the vapor pressure of SO₂ itself is about 20 atmospheres at this temperature.

Due to the absence of water, the sulfite-bisulfite salt of the diamine which is formed in aqueous solutions, cannot be present in the alcoholic concentrate, thus the reaction product is chemically different than that obtained when SO₂ and the amine are reacted in water.

After the reaction product has been prepared according to the above description, it can be added to either aqueous or hydrocarbon corrosive liquids. In general, only a very small amount of reaction product is required to effect the necessary corrosion inhibition. It has been found that the reaction product when present in concentrations as low as 5 p.p.m. based on the weight of the corrosive liquid, a substantial reduction in corrosion occurred. Generally speaking, the reaction product need not be present in amounts of greater than 50 p.p.m. based upon the weight of the corrosive liquid and highly satisfactory results can be obtained with concentrations between 25 p.p.m. and 35 p.p.m. when the corrosive liquid is aqueous. 10 p.p.m. of the reaction product often shows satisfactory corrosion inhibition, but in some instances, higher concentrations will be desirable and in these cases, 150 to about 200 p.p.m. of the reaction product will be used. These higher concentrations would be necessary where the corrosive liquid is highly saturated with oxygen or air and is aqueous.

Description of the preferred embodiment

In order to show the effectiveness of the reaction product apparent according to this invention, a testing procedure was designed to duplicate closely the corrosion (including pitting) conditions existing in pipes used for water flooding operations. In this testing procedure, about 800 milliliters of air saturated brine containing 3% sodium chloride was placed in a stoppered bottle and maintained at an ambient temperature of about 70° F. A rod inserted through a rubber stopper and having a ferrous strip of the dimensions ⅛ x 2¾″ and a thickness of 4 mils mounted thereon was inserted into the bottle so that the ferrous strip was in the solution and the rubber stopper closed the mouth of the bottle. The water in the bottle was maintained in a state of agitation by means of a magnetic stirrer. In order to determine the effect of the dissolved oxygen on localized pitting and so forth, each ferrous strip had a rubber band tied around its middle.

The following table summarizes the results which were obtained by the above tests when using the N-coco-1,3-trimethylene diamine reaction product prepared according to the present invention and the concentrations indicated on the table. The concentration of the various additives were based upon the weight of the water medium in the bottle.

| Inhibitor | Conc., percent wt. in water | Test results |
|---|---|---|
| N-coco trimethylene diamine | 0.02 | Probe penetrated in 24 hours. |
| Reaction product of 1 mol of N-coco trimethylene diamine with 2 moles of sulfur dioxide. | 0.015 | No corrosion, even under rubber band, after 72 hours. |

Using the same reaction product in the table above, aqueous solutions were prepared containing 0.05% by weight of the reaction product. Thereafter, clean steel specimens were immersed in the aqueous solution for a period of 72 hours, with no visible indications of rust. In a similar test, only 0.015% by weight of the reaction product was added to the aqueous medium and it was aerated to achieve an oxygen concentration between 0.05 to 0.06 p.p.m. of oxygen. Again, after 72 hours there was no indication of rust on the clean steel specimens suspended in these treated aqueous solutions.

The following example of the commercial preparation of the reaction product is illustrative of the invention.

EXAMPLE I

To a large, glass-lined vessel equipped with a mixer and cooling coils and a gas sparger in the bottom thereof, 1,620 pounds of methanol was added. Oleyl diamine was then added to the alcohol in an amount (approximately 1,080 pounds of diamine) to give a 40% by weight solution.

After the above solution had been mixed, the total equivalent base of the solution was calculated by titrating a weighed sample of the solution. When the total equivalent base was determined the weight of $SO_2$ necessary to give 0.80 mole of $SO_2$ per equivalent of base (approximately 365 pounds) was calculated.

The $SO_2$ was added through gas sparger while stirring the solution and withdrawing heat through the cooling coils to keep the solution below 100° F.

The end point of the reaction can be determined by adding samples of the mixture in the vessel to 50% by volume of distilled water and checking the resulting pH. When the pH is between 5.5 and 6.0 the addition of $SO_2$ is stopped.

The concentrate can be used directly or some of the methanol can be removed to concentrate the reaction product.

The material so prepared was field tested by treating well equipment used in a in situ combustion project where water was being injected. In a 40 day test at a concentration of 100 p.p.m. of the methanolic reaction product, the corrosion specimens in the production flow line indicated a 50% or greater reduction in the corrosion rate.

What is claimed:

1. A method to prevent corrosion of ferrous materials by corrosive aqueous fluids which comprises adding from 5 to 150 p.p.m. to the aqueous fluid of the reaction product prepared by the steps comprising:
    (a) dissolving a polyamine selected from the group consisting of N-aliphatic and N-alicyclic-substituted alkylene polyamines wherein the aliphatic and alicyclic radicals have from 6 to 24 carbon atoms in $C_1$–$C_5$ alcohols;
    (b) introducing $SO_2$ into said alcoholic medium while maintaining the temperature of said medium below 100° F. until a sample of said medium when mixed with 50% by volume of distilled water will have a pH from 5.5 to 6.0 and
    (c) adding 5 to 150 p.p.m. of the resulting reaction product concentrate to corrosive aqueous fluids contacting ferruginous material to reduce the rate corrosion of said materials.

2. The process according to claim 1 wherein the reaction product concentrate contains at least 40% by weight of the reaction product.

3. The process according to claim 2 wherein the alcoholic medium is partially removed by vacuum stripping to increase the amount of the reaction product in the concentrate.

4. The process according to claim 1 wherein from 5 to 60 p.p.m. of the reaction product concentrate is added to the corrosive aqueous fluid.

5. The method of claim 1 wherein the polyamine is N-coco-1,3-trimethylene diamine.

6. The method of claim 1 wherein the polyamine is N-oleyl diamine.

7. The method of claim 1 wherein the polyamine has been the formula:

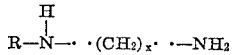

where R, is a $C_8$–$C_{20}$ alkyl radical and $x$ is a number of from 2 to 10.

References Cited

UNITED STATES PATENTS 3,412,157  11/1968  Raifsnider.
3,134,756  5/1964  Mattson.
2,102,654  12/1937  Snow _____ 260—43

JULIUS FROME, Primary Examiner

T. MORRIS, Assistant Examiner

U.S. Cl. X.R.
252—395, 391